United States Patent [19]
Smith et al.

[11] Patent Number: 5,240,654
[45] Date of Patent: Aug. 31, 1993

[54] METHOD OF MAKING CERAMIC MICROSPHERES

[75] Inventors: Thomas K. Smith, Queensland; Raymond W. Shaw, North Balwyn; Christopher J. Heathcock, Kew; Leslie C. Edwards, Watsonia; Malcolm J. Couper, Diamond Creek; Kenong Xia, Mitcham, all of Australia

[73] Assignee: Comalco Aluminium Limited, Melbourne, Australia

[21] Appl. No.: 948,559

[22] Filed: Sep. 23, 1992

Related U.S. Application Data

[62] Division of Ser. No. 630,968, Dec. 21, 1990, Pat. No. 5,175,133.

[30] Foreign Application Priority Data

Dec. 22, 1989 [AU] Australia .............. PJ 8009
May 9, 1990 [AU] Australia .............. PK 0045

[51] Int. Cl.⁵ ............................ C04B 35/10
[52] U.S. Cl. .................... 264/13; 264/56; 264/125
[58] Field of Search ............ 264/56, 125, 5, 13

[56] References Cited

U.S. PATENT DOCUMENTS

| | | | |
|---|---|---|---|
| 4,273,735 | 6/1981 | Jacques et al. | 264/5 |
| 4,407,967 | 10/1983 | Luks | 264/125 |
| 4,427,068 | 1/1984 | Fitzgibbon | 501/127 |
| 4,440,866 | 4/1984 | Lunghofer et al. | 501/127 |
| 4,623,630 | 11/1986 | Fitzgibbon | 501/127 |
| 4,639,427 | 1/1987 | Khaund | 501/128 |
| 4,668,645 | 5/1987 | Khaund | 501/33 |
| 4,713,203 | 12/1987 | Andrews | 501/131 |
| 4,879,181 | 11/1989 | Fitzgibbon | 501/127 |
| 4,894,285 | 1/1990 | Fitzgibbon | 501/127 |
| 4,921,820 | 5/1990 | Rumpf et al. | 501/127 |

Primary Examiner—Mary Lynn Theisen
Attorney, Agent, or Firm—Nikaido, Marmelstein, Murray & Oram

[57] ABSTRACT

A calcined microsphere of ultrafine bauxite particles having a mean particle size in the range 0.01 to 0.3 micrometers, said microsphere having a particle size less than 30 micrometers and being characterized by a substantially solid form having a pycnometric density substantially falling in the range 3.2–3.0 g/cm$^3$, a BET surface area substantially falling in the range 0.05 to 0.5 m$^2$/g and a crystal grain size less than 4 micrometers, the surface chemistry of the microsphere being modified to enhance the wettability of the microsphere and to improve its ability to bond strongly with matrix materials in use.

7 Claims, 10 Drawing Sheets

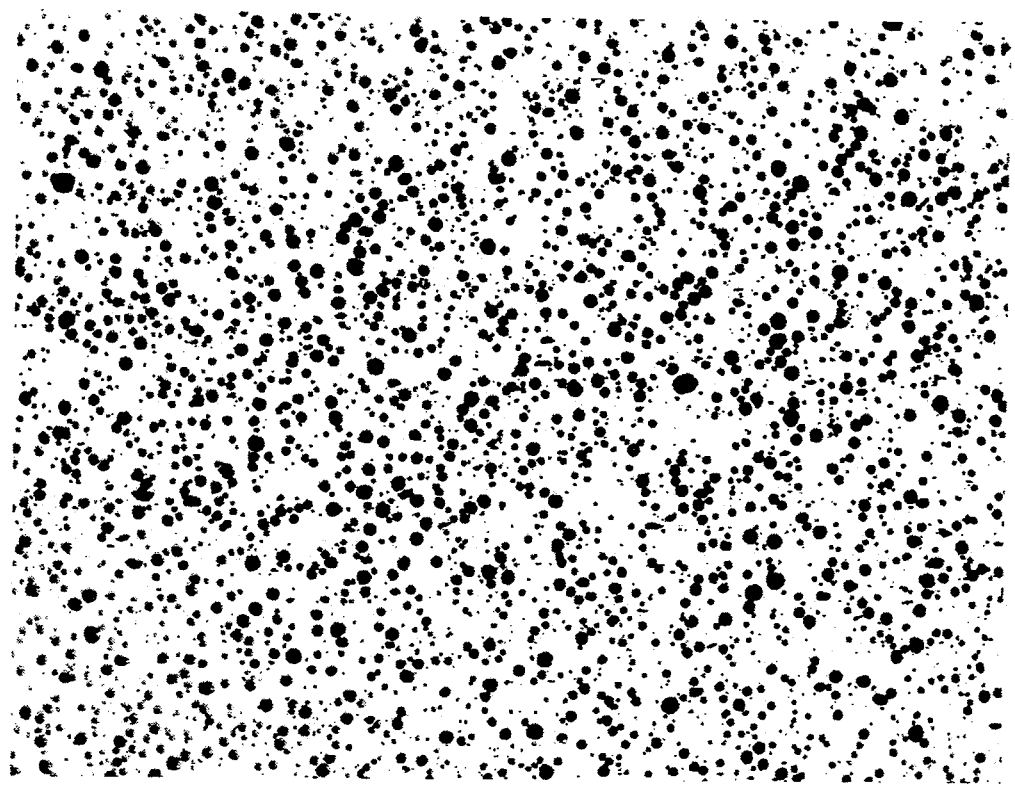
FIG. 10 ⊢――――⊣ 600 μm
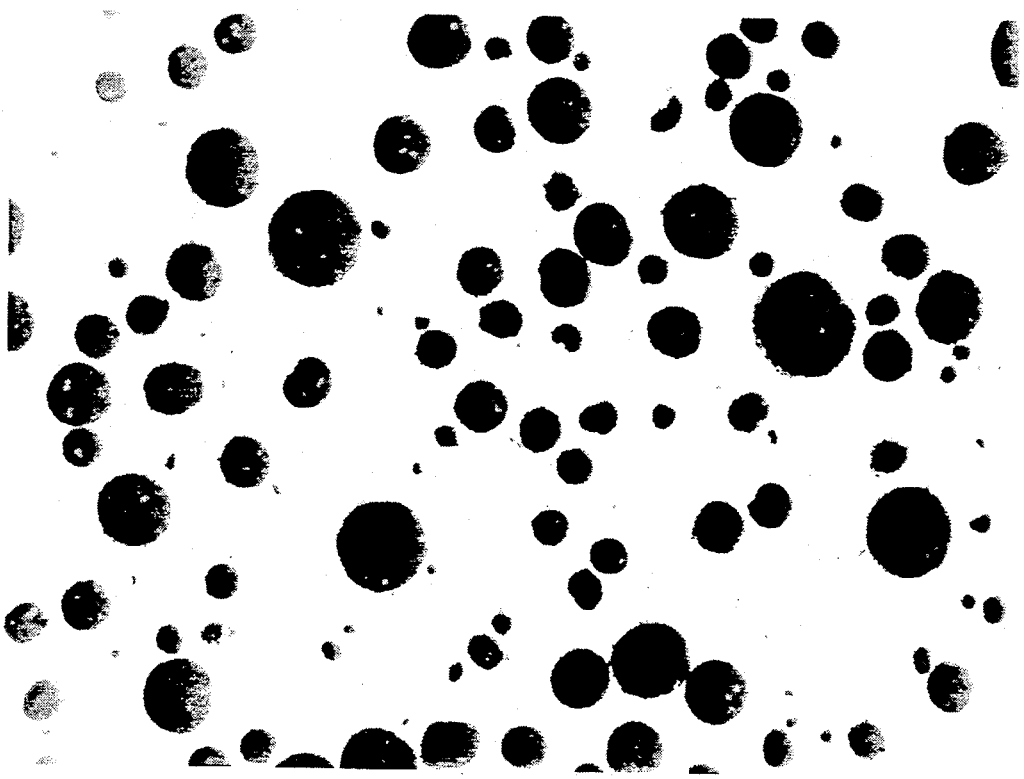
FIG. 11 ⊢――――⊣ 100 μm

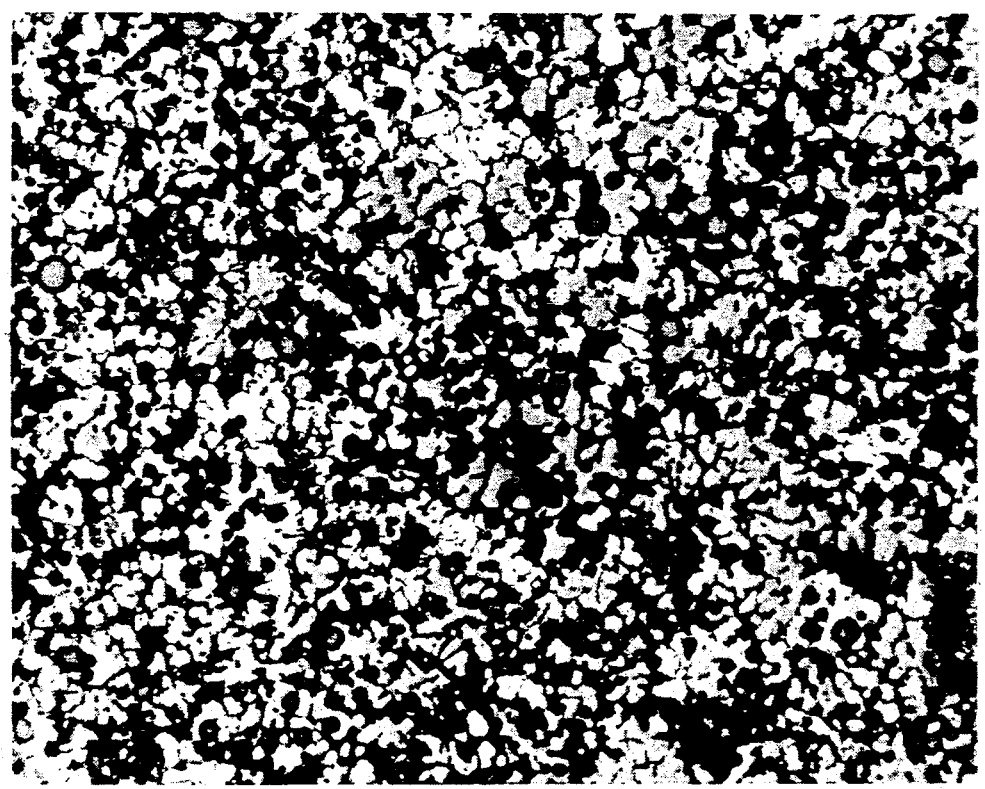
FIG. 12 ⊢―――⊣ 300 μm
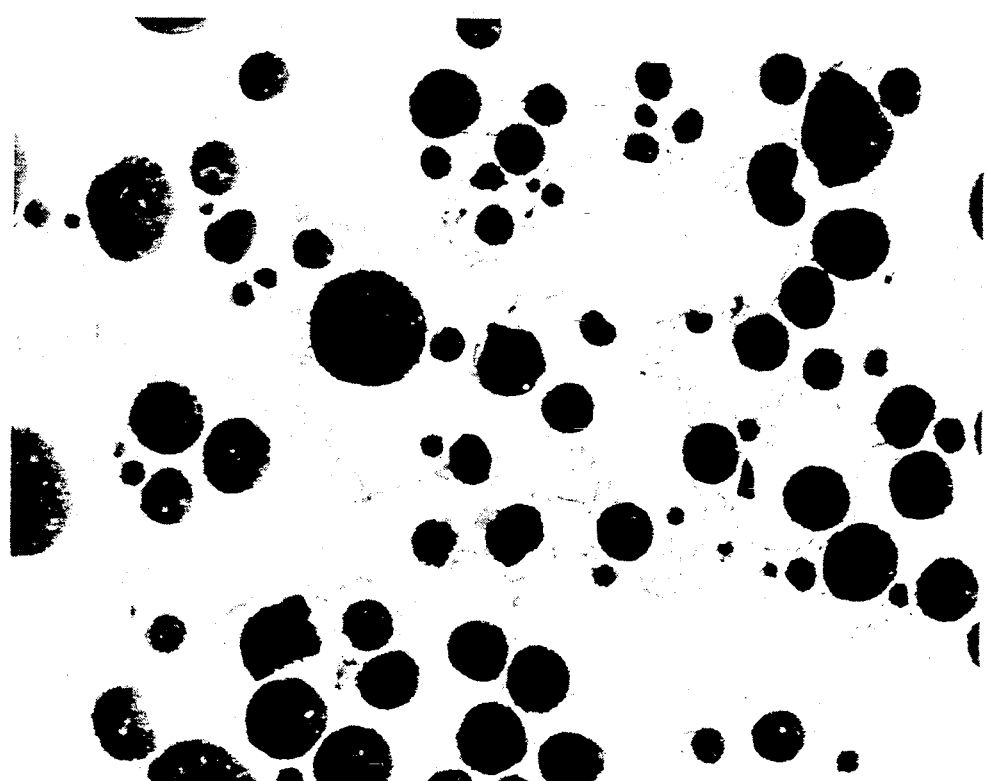
FIG. 13 ⊢―――⊣ 100 μm

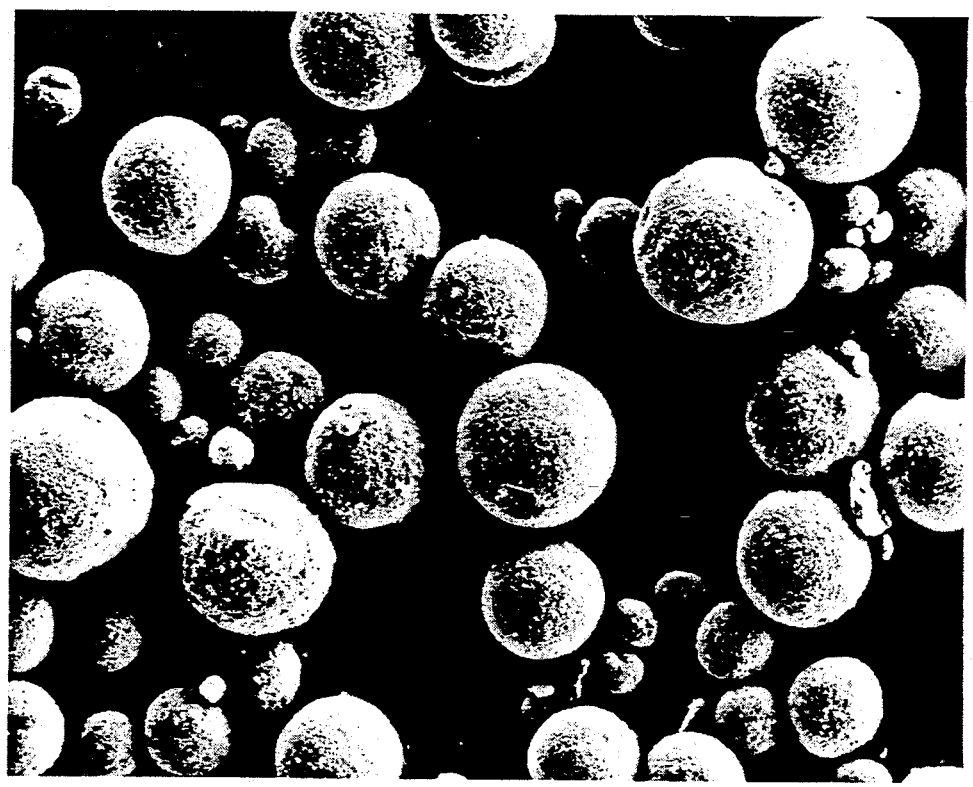
FIG. 16  ⊢―――⊣ 40 µm
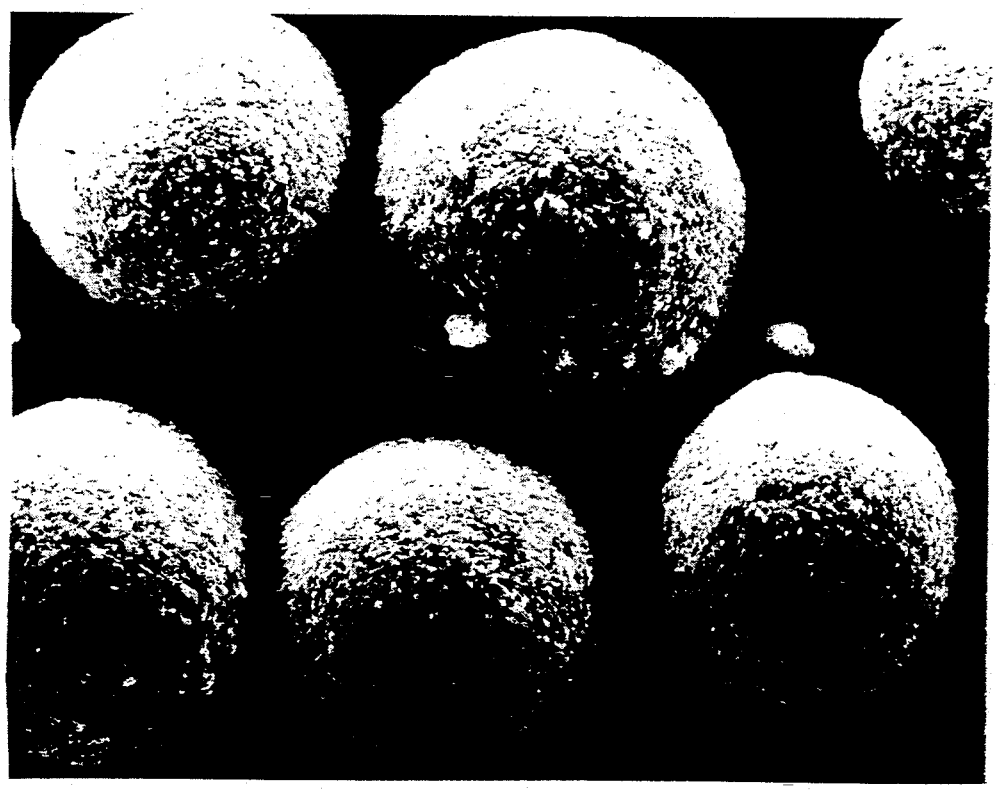
FIG. 17  ⊢―――⊣ 15 µm

METHOD OF MAKING CERAMIC MICROSPHERES

This is a division of application Ser. No. 630,968 filed Dec. 21, 1990, now U.S. Pat. No. 5,175,133.

FIELD OF THE INVENTION

This invention is concerned with ceramic microspheres produced from bauxite and the use of such microspheres as reinforcing materials and functional fillers.

BACKGROUND OF THE INVENTION

Various processes for the manufacture of microspheres of small diameter in the range 40-60 micrometers and with somewhat larger microspheres having a diameter in the range 0.25 to 5.0 millimeters have been described in the prior art, for example Japanese Published Patent Application Number 57-84731 and U.S. Pat. No. 4,746,468.

U.S. Pat. Nos. 3,491,492, 4,068,718, 4,427,068 and 4,713,203 all describe processes for manufacture from clay or bauxite materials substantially spherical ceramic particles or pellets in the size range 0.25-5.0 millimeters, primarily for use as proppants. Apart from U.S. Pat. No. 4,713,203 which utilizes naturally occurring bauxite fines as feedstock the other prior art documents describe the use of relatively coarse clay or bauxite particles. U.S. Pat. No. 4,427,068 does imply however that expensive grinding of calcined clay or bauxite may be employed to produce particle size less than 15 micrometers.

Each of U.S. Pat. Nos. 3,491,492, 4,068,718, 4,427,068 and 4,713,203 is concerned with the manufacture of proppants for hydraulic fracturing of subterranean formations and each requires the physical formation of pellets by agglomeration in a rotary pelletizer or the like, with or without a binder. Subsequently calcining of the green pellets is usually carried out in a rotary calcining kiln.

Previously attempts to produce spherical proppants by spray drying have produced rounded non spherical particles characterized by a hollow recess similar in appearance to a mushroom cap. This shape has been ascribed to aerodynamic deformation of the slurry droplet in the hot gas stream before the particle dried.

Metal-matrix composites (MMCs) consist of a matrix of a metal or alloy into which one or more second phases have been incorporated with the aim of reinforcing for improved properties. After many years of research, these materials are now becoming commercially available. The enhancement in properties over those of the matrix material which can be achieved include:
  improvement in strength at ambient and high temperatures,
  improvement in stiffness,
  improvement in fatigue strength,
  improvement in wear resistance,
  reduction in coefficient of thermal expansion.

These property enhancements have made MMCs attractive for structural applications at room temperature and at elevated temperatures. The magnitude of the enhancements in properties depend on many factors, such as, the:
  matrix metal or alloy,
  content of the reinforcing phases,
  chemistry, geometry, distribution and orientation of the reinforcing phases,
  nature of the interface between the reinforcing phases and the matrix material,
  manufacturing method,
  thermo-mechanical history.

In addition, all other factors which generally affect properties of metallic materials, such as the heat-treatment, fabrication, porosity level, etc., also affect the properties of MMCs.

Aluminium, magnesium, titanium, copper and their alloys can be used as matrix materials. For reinforcing purposes, a variety of compounds such as carbides, oxides, nitrides, borides, etc. and elements such as carbon and boron, in various forms such as fibres, whiskers, platelets and particulates, have proven to be effective. High performance fibres and whiskers are manufactured by costly, energy-intensive processes which make them expensive, resulting in high cost to the finished MMC product. There are certain lower performance fibres and particulates, however, which produce moderate property improvements at low cost. The present invention relates to a reinforcement for low-cost MMCs incorporating an in inexpensive naturally occurring raw material.

Although, some naturally occuring materials such as natural graphite, mica and zircon sand have been examined for reinforcing application in MMCs, they are not recommended because the properties of the resulting MMCs are generally poorer than those of the matrix. An important aspect of this invention is the use of a naturally occuring mineral as the starting material for reinforcement of MMCs and other composites leading the enhancement in properties.

The geometries of reinforcing materials employed by MMC producers are typically fibre, platelet and particulate. The fibre geometry has a long dimension in one direction which is the preferred direction of reinforcement. Little or no reinforcing effect, sometimes even deleterious effects, are observed in the directions perpendicular to the longitudinal direction. The platelet geometry, in turn, imparts reinforcing effects only in the plane of the platelet which, again, is the preferred plane for reinforcement, Consequently, MMCs reinforced by fibres and platelets exhibit anisotropic properties. Randomly oriented fibres and platelets can restore isotropy but this is difficult to achieve in practice and unlikely to be maintained during forming operations.

Particle reinforced composites do not exhibit the anisotropic characteristics of fibre or platelet composites. Hence they are the most efficient for the production of isotropic MMCs, in addition to being low in cost. The use of the ceramic microspheres defined above as a reinforcing material offers, by virtue of its geometry, a high degree of isotropy to the MMCs.

The particulate materials presently used for reinforcing purposes have angular or irregular shapes. When reinforcements of such shapes are incorporated in a metallic matrix, the particles can act as stress raisers under the action of an applied stress. This can lead to premature nucleation of cracks with associated reduction in plasticity of the MMC. Reduced plasticity is reflected in lower elongation, toughness, formability and perhaps strength. The geometry and fine microstructure of the particulate material embodied in this invention is free of any stress raising features such that MMCs reinforced with the material have improved ability for plastic deformation.

Microspheres of the above type have now been determined to be suited for use as a reinforcement material in metals to form metal matrix composites as well as in other materials such as plastics, to provide improved strength and wearing properties. In making microspheres for this purpose it is important to ensure that the microspheres have properties which promote "wetting" which determines the extend to which the interface of the microsphere transforms the strengthening effect of the ceramic.

Good wettability between the matrix alloy and the reinforcing material is critical for the production of good quality MMCs. Many studies have shown that commercial reinforcing materials are not easily wetted by molten metals and alloys, and similar comments apply with equal validity to offer materials such as plastics. A good reinforcing material, therefore, should exhibit good wettability while being relatively inert to the matrix alloy. Such a reinforcing material is provided in this invention.

SUMMARY OF THE INVENTION AND OBJECT

Accordingly, it is an aim of the present invention to provide bauxite microspheres having improved sphericity, density, such as chemistry and crystal structures and to provide a simple and economic method for the production of such microspheres from bauxite and bauxitic clays.

According to one aspect of the invention there is provided a calcined microsphere of fine bauxite particles, said microsphere having a particle size less than 100 micrometers and being characterized by a substantially solid form having a pycnometric density substantially falling in the range 3.2 to 3.9 g/cm$^3$, a BET surface area substantially falling in the range 0.05 to 0.05 m$^2$/g and a crystal grain size less than 4 micrometres, said microsphere having a surface chemistry selected to enhance the wettability of the microsphere and improve its ability to bond strongly with the matrix materials in use.

In a preferred form of the invention, the microspheres are formed from bauxite particles having a mean particle size substantially falling within the range 0.01 to 0.3 micrometers and the microspheres have a particle size substantially falling in the range 1 to 50 micrometers and most preferably less than 30 micrometers and a crystal grain size of less than 2 micrometers.

By providing the calcined microsphere with the above defined properties, the microspheres are better adapted to perform well in the selected end composite. All of the defined features influence wetting. Wetting in turn influences ease of preparation of the MMC and also determines how well the interface transfers the strengthening effect of the ceramic. The mechanical properties (stiffness and strength) of the microsphere depend on the phases and structure which in turn influence properties of the composite product. The combination of spherical shape and microcrystalline structure provide isotropic properties in the composite. The shape on its own influences certain properties since notch effects are eliminated and formability and castability are also improved.

The available range of microspheres size 0-100 um which is a consequence of the spray-drying method is an important advantage since other reinforcing materials are available in only limited size ranges. For example, commonly available SiC, Al$_2$O$_3$ have a narrow size range 1-5, 5-15, 10-25, etc.

Typical property data for a preferred calcined microsphere embodying the invention are:

|  | Wt % |
| --- | --- |
| Chemical Composition | |
| Al$_2$O$_3$ | 70-90 |
| SiO$_2$ | 4-20 |
| Fe$_2$O$_3$ | 0-15 |
| TiO$_2$ | 0-6 |
| Na$_2$O | 0-0.5 |
| K$_2$O | 0-1 |
| Phase Analysis | |
| Mullite (3Al$_2$O$_3$.2SiO$_2$) | 30-90 |
| Corundum ($\alpha$-Al$_2$O$_3$) | 10-70 |
| Pseudobrookite [(Fe, Al)$_2$ TiO$_5$] | 0-10 |
| Crystal Gram Size | 0-4 um |
| Bulk (Tapped) Density | 1.8-2.4 g/cm$^3$ |
| Pycnometric Density | 3.1-3.9 g/cm$^3$ |
| BET Surface Area (Nitrogen Adsorption) | 0-0.5 m$^2$/g |
| Microsphere Particle Size Range | 0-100 um, preferably less than 30 um |

According to another aspect of the invention there is provided a method for the manufacture of bauxite microspheres, comprising the steps of:

preparing a dispersion of bauxite or bauxitic clay;

classifying the dispersed bauxite particles to recover the ultrafine fraction;

adding small quantities of water soluble salts, mineral compositions or organometallic complexes to control the microsphere surface chemistry so as to enhance the wetting and dispersion of the microsphere and improve its ability to bonding strongly with the matrix materials in use;

spray drying the dispersion to produce green microspheres of a predetermined means particle diameter, and subjecting said green microspheres to calcination and sintering to produce microspheres having a size within the range 0-100 micrometers, preferably from 1 to 50 micrometers and most preferably less than 30 micrometers, said microsphere being characterised by a substantially solid form having a pycnometric density substantially falling in the range 3.2 to 3.9 g/cm$^3$, a BET surface area substantially falling in the range 0.05 to 0.5 m$^2$/g and a crystal grain size less than 4 micrometres.

In a preferred form of the invention, between 0.05 and 5 wt % of the water soluble salt, mineral composition or organometallic complex is required to achieve the necessary modification of the surface chemistry of the resultant microsphere. The additions may contain elements selected from Group 1, 2 or 3 of the Periodic Table.

Preferably said dispersion of bauxite or bauxitic clay comprises an aqueous slurry having a solids content in the range 10-70% w/w solids.

Suitably, spray drying is carried out by directing a fine spray of said slurry into a heated region under conditions adapted to produce green microspheres of predetermined means particle size.

Preferably calcination and sintering is effected in a stationary or gas suspension calciner, in a temperature range between 1100° C. and 1600° C., and most preferably between 1300° C. and 1450° C.

According to yet another aspect of the invention there is provided a composite material comprising as a functional filler bauxite microsphere product in accordance with the invention. Suitable composites include metalmatrix composites (MMCs) and plastics composites.

The present invention preferably uses ultrafine bauxite or bauxitic clay as the starting material. The relative ease of manufacture and the superior material properties of the product formed from the preferred material arise primarily from the choice of starting material, an ultrafine fraction of a naturally occurring bauxite. This ultrafine fraction has a particle size typically less than 1 micrometer and more typically from about 0.02 to 0.3 micrometers with an associated surface area of about 34 square metres per gram. This extreme fineness and the unique chemical composition of such ultrafine bauxites lends advantages to the manufacturing process and resulting microsphere including:

the need for expensive pregrinding is eliminated
the need for expensive precalcination is eliminated
high strength of the green microsphere is obtained without the addition of a binder
the very high surface area of the feed material makes it highly reactive. This leads to a reduction in sintering time, hence in energy consumption
an exceptionally high degree of uniformity in the composition of the microspheres The advantages of the product produced according to the invention may be summarized as follows:

1. The very fine particle size of the bauxite or bauxitic clay feedstock allows an exceptionally high degree of uniformity of blend in the manufacture of the green microsphere.
2. The green microsphere comprising a multitude of ultrafine particles has numerous points of contact between the particles, and it is at these points that sintering will be initiated.
3. It has been found that the extremely intimate dispersion of minerals and thus of constituent elements is conducive to a high degree of reactivity within each microsphere as it is heated. This leads to a correspondingly intimate dispersion of microcrystallites on sintering. The microspheres thus exhibit very high strength. It is well known in the art that ceramic products with a fine microcrystalline structure are extremely strong.
4. The ultrafine particle size of the constituted minerals, combined with the small target size of the manufactured green microspheres, permits the use of the simple spray drying process to form particles of substantially spherical shape. Previous experience with the same material in spray drying to form larger particle diameters resulted in rounded but not spherical particles which were characterised by a shape of mushroom cap appearance. This shape has been ascribed to the aerodynamic deformation of the slurry droplet before it dried in the hot gas stream of the spray dryer. It has now been found that when the droplet size is restricted to a particle size less than about 100 micrometers, these deformities in shape substantially disappear. Scanning electron microscopy reveals that sphericity of particles under about 70 micrometers improves dramatically, with particles in the range from about 5 to 45 micrometers being almost perfectly spherical. It is believed that the higher rate of surface tension to mass in the fine droplets overcomes the tendency to form non-spherical particles.
5. Since the only mechanism employed in the formation of the green microspheres from the ultrafine particles is the removal of hygroscopic moisture by drying, it will be apparent that the optimum benefit has been obtained from the extremely high interparticulate Van der Wall's forces. This leads to near maximum densification of the particles without the need for an expensive binder.
6. The spray drying process allows relative simple control over the particle size of the green microspheres. Choice of such appropriate spray drying parameters such as slurry solids concentration, slurry viscosity rate of introduction of inlet and outlet temperature and spray head type and configuration permit this control to be achieved.
7. The choice of the calcination and sintering process is an important element in the large scale commercial production of ceramic microspheres from bauxite or bauxitic clay. Although the small scale production by firing in loosely packed beds is feasible, the process must be interrupted at a relatively high temperature to allow the bed to be stirred and to prevent the particles sintering together at the temperature chosen for optimum densification of the individual particles. This is clearly not feasible on a commercial scale. The small size of the green microspheres and their free-flowing nature precludes the economic and practical use of conventional rotary kilns as unacceptable losses of finer microspheres would occur. It was considered that the use of modern stationary calciners such as the so-called flash and gas suspension calciners and which are successfully used for the calcination of such materials as fine aluminium trihydroxide would not be suitable for the calcination and sintering of the ceramic microspheres. It was thought that the very steep temperature gradient and very short residence times typical of such apparatus would lead to the shattering of the microspheres due to the inability of hygroscopic and chemically bound moisture to diffuse from the microspheres at sufficiently rapid rate. It was also thought that the turbulent nature of the hot gases in the calcination and sintering zone of the calciner that the microspheres would sinter together. Surprisingly, it was found that the amount of particle degradation in the product was low. It was also surprisingly found that few of the microspheres were sintered together.

In order that the invention may be more clearly understood reference is now made to preferred embodiments illustrated in the following examples and Figures in which:

FIG. 10 is a microstructure section of an extruded COMRAL-85 composite sample (unetched) showing the uniform distribution of particulate;

FIG. 11 is a further enlarged microstructure section of an extruded COMRAL-85 composite sample (unetched) showing the uniform distribution of particulate;

FIG. 12 is a microstructure section of a gravity cast Al-Si alloy reinforced with 15 vol % of ceramic microspheres (etched);

FIG. 13 is a further enlarged microstructure section of a gravity case Al-Si alloy reinforced with 15 vol % of ceramic microspheres (etched);

FIG. 16 is a low magnification scanning electron microscope (SEM) image of the calcined microspheres embodying the invention;

FIG. 17 is a high magnification scanning electron microscope (SEM) image of the calcined microspheres embodying the invention;

Figure 1:
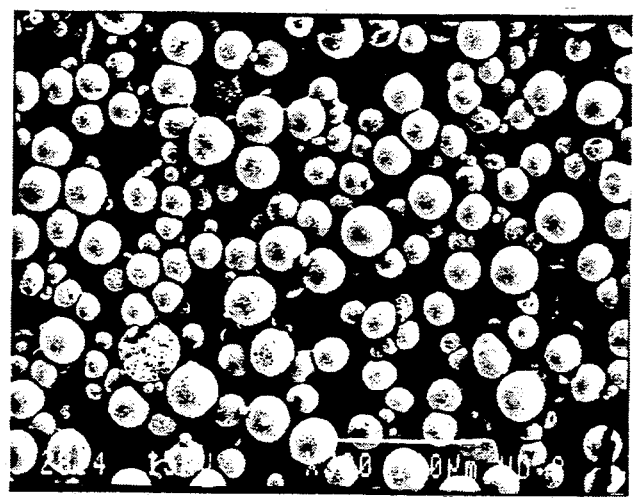
FIG. 1 is a scanning electron micrograph of microspheres embodying the invention of size range 1–40 μm.

Finely divided materials suitable for the production of ceramic microspheres according to the invention are readily obtained from bauxite deposits such as for example those of the type occurring at Weipa in Northern Queensland. In these and similar bauxites and bauxitic clays, a fine fraction exists which is easily separated, for example, by slurrying the bauxite in water in the presence of a dispersant. A variety of dispersants may be used, such as compounds based on phosphates or polyacrylates.

A simple separation step results in recovery of the fine fraction as a dilute slurry from coarse particulate matter. Satisfactory separation may be effected for instance using gravity settlers or hydrocyclones.

In order to render the process economical it is necessary to increase the solids concentration of the slurry of fine particles. This may be conveniently done by adjusting the pH of the slurry to about pH7 by the addition of acid. Sulphuric and hydrochloric acids are satisfactory for this purpose. The fine particles are then seen to agglomerate. These agglomerates are then observed to settle. It will be recognised by those skilled in the art that flocculants may be used to assist in the more rapid settling and increasing the density of the settled solids.

The solids content of the settled slurry may still be too low for economical operation of the process, and it may be necessary to introduce a further dewatering step, such as centrifugation or filtration.

The thickened solids now have the consistency of a paste, and it is necessary to redisperse them to a suitable low viscosity before the next step.

More efficient dispersion may be facilitated by the addition of dispersant such as polyacrylates e.g. ammonium polyacrylate, sodium hexametaphosphate or sodium polyphosphate. The use of a high intensity mixer aids in the destruction of agglomerates and the dispersion of most of the particles in their liberated form.

A spray dryer, such as manufactured by the Niro company, or as manufactured by the Bowen-Stork compant, is used to form the green microspheres. It is possible to exercise control over particle size distribution by controlling the preparation of the dispersed slurry and the conditions of operation of the spray dryer.

It has been found that the particular fraction of bauxite proposed as a source of microspheres has in the Weipa deposits an alumina content of about 59% with a typical range from 55-63%. Similarly, the silica content will average about 10%, with a range typically 7-13%. Substantially, all of this silica will be present as the mineral kaolinite, although small amounts of quarts may be present. Typically, the mineraology will comprise 30-50% gibbsite with 15-45% boehmite, 16-27% kaolinite with less than 0.2% quartz. Oxides of iron 6-10% and titanium 3-5% will total about 8-14%. This relatively high level of iron oxide reduces the calcination temperature and results in the formation of the pseudobrookite phase in the calcined microspheres.

Electron microscope studies have confirmed that the mineral particles are typically from about 0.02 to 0.3 micrometers in diameter and the minerals gibbsite, boehmite, kaolinite, hematite and anatase are commonly present as liberated crystallites. In other words, the particles are frequently mono-minerallic in nature, and because of the large surface area and the presence of relatively high levels of non-oxide in the bauxite chemistry, rapid reaction between particles is facilitated at elevated temperatures, producing mainly corundum and mullite.

In the course of heating such a product to the typical range of 1300°-1600° C. to produce the range of properties typically required in the product, a series of changes occurs in the microspheres.

The alumina minerals which are present, namely, gibbsite, boehmite and kaolinite progressively lose their combined water as the temperature is increased to about 600° C.

The crystal lattices become disordered and as the temperature is further increased the aluminium oxides undergo a series of phase changes. It is to be expected that the sequence of phase changes may include as transition states gamma, delta, theta, chi and kappa form of alumina. As a temperature of approximately 950° C. the formation of mullite commences and at about 1050° C. the alumina begins to convert to the alpha-phase mineral which is known as corundum. Further increase in temperature causes sintering of the mullite and corundum and the production of a pseudobrookite phase to form a polycrystalline ceramic body with high strength.

The phases corundum, mullite and pseudobrookite are the final major phases in the end product. As the temperature is increased the particles gain in compressive strength due to the development of an extremely fine interlocking network of crystals. Excessively high temperatures result in a coarsening of the crystal size which then reduces the strength of the ceramic.

During sintering, the pellets may shrink in diameter by up to 30% so the spray drying process is controlled to produce green microspheres which will produce the required calcined microsphere falling in the preferred ranges 1-100 micrometers, and preferably less than 30 micrometers.

The high reactivity of the uncalcined bauxite and its very fine particle size facilitates the formation of the required phases.

The green microspheres are subjected to calcination and sintering to form the final product. On a laboratory scale, calcination is performed by placing the green microsphere in a suitable crucible and heating the crucible in a muffle furnace to about 900° C. The heating rate should be slow enough to allow diffusion of the chemically bonded water to occur. This rate is suitable of the order of about 100° C./hour.

After the initial temperature range of about 900° C. has been attained, heating is continued with a temperature increase rate of about 10° C./minute until the crucible and its contents reach about 1300° C. The process is then interrupted to prevent the sintering of the particles to each other.

The material is cooled, lightly crushed to break up any agglomerates and screened through a 106 um screen to ensure individual particles. The microspheres are then returned to the crucible and rapidly fired up to the final sintering temperature of between 1300-1600° C. at a rate of about 20° C./minute. It is apparent to those skilled in the art that the temperatures and times chosen for the sintering of the microspheres are dependent on the chemical composition of the raw material, as well as the desired properties of the product. For instance, density and porosity of the product may be varied by altering the sintering temperature and time. Generally, a sintering temperature between 1300° C. and 1600° C. is used.

The economic product of ceramic microspheres on a large scale industrial basis demands a continuous calcination process, rather than the batch process previously described. This is most satisfactorily accomplished in a stationary gas suspension calciner, in which the particles are transported by a moving stream of gas through the drying, calcination and cooling sections of the apparatus. The product may be separated by gravity, or by cycloning or filtration.

For purposes of example, such devices are manufactured by the Deutsche-Babcock and Lurgi companies of the Federal Republic of Germany, the F. L. Smidth company of Denmark, or the Fuller company of the United States of Americal. As well as being a more economic process, improvement to the quality of the product are noted. This is particularly in respect to the microcrystallinity of the particles which is expressed in the surface and strength of the sintered particles.

Gas suspension calciners feature a particularly short residence time of particles in the sintering zone of the furnace. For instance, the High Temperature Mixer manufactured by the Beutsche Babcock company, features a residence time in the calcination zone estimated at about one quarter to one half of a second. As a consequence of this short residence time, crystal grain growth is inhibited, and a fine crystal microstructure is evident. The average crystal grain size has been estimated to be about one micrometer. As is known to those skilled in the art, a fine microstructure is conducive to obtaining strength in a ceramic object. The fine microstructure is also important in conveying a smooth surface to the microspheres. When used in composites which are to be subject to such processes as injection moulding, wear of the surfaces of the forming equipment is reduced.

Using the process described above, the following bauxite microspheres were produced:

| Example 1: | Chemical Analysis | Wt % |
|---|---|---|
| | $Al_2O_3$ | 73.0 |
| | $SiO_2$ | 9.0 |
| | $Fe_2O_3$ | 13.7 |
| | $TiO_2$ | 4.3 |
| | $Na_2O$ | 0.15 |
| | Phase Analysis | Wt % |
| | Mullite | 40 |
| | Corundum | 55 |
| | Pseudobrookite | 5 |
| | Crystal grain size | 0.2-2 um |
| | Bulk (Tapped) Density | 2.1 g/cm$^3$ |
| | Pycnometric Density | 3.66 g/cm$^3$ |
| | BET Surface Area | 0.14 m$^2$/g |

Particle Size Distribution (Leeds and Northrup Microtrac)

| Particle Diameter (um) | Cummulative Percent Passing |
|---|---|
| 62 | 100 |
| 44 | 92.4 |
| 31 | 64.6 |
| 22 | 32.4 |
| 16 | 13.3 |
| 11 | 5.5 |
| 7.8 | 1.7 |
| 5.5 | 0.3 |
| 3.9 | 0 |

| Example 2: | Chemical Analysis | Wt % |
|---|---|---|
| | $Al_2O_3$ | 71.6 |
| | $SiO_2$ | 17.2 |
| | $Fe_2O_3$ | 7.02 |
| | $TiO_2$ | 3.82 |
| | $Na_2O$ | 0.13 |
| | Phase Analysis | Wt % |
| | Mullite | 70 |
| | Corundum | 23 |
| | Pseudobrookite | 4.5 |
| | Crystal grain size | 0.3-1 um |
| | Bulk (Tapped) Density | 2.0 g/cm$^3$ |
| | Pycnometric Density | 3.42 g/cm$^3$ |
| | BET Surface Area | 0.12 m$^2$/g |

| Particle Size Distribution | (Malvern Mastersizer) Cummulative Percent Passing |
|---|---|
| 100 | 100 |
| 60 | 95 |
| 45 | 92 |
| 30 | 56 |
| 20 | 27 |
| 10 | 8 |
| 5 | 3 |
| 2 | 1 |
| 3.9 | 0 |

The sodium levels in the samples described in Examples 1 and 2 were carefully controlled by the addition of 0.15 wt/wt % sodium hydroxide during the slurry preparation step. The sodium was added to modify the surface composition of the microsphere for certain applications such as the reinforcement of aluminium alloys. The presence of sodium on the particle surface enhances wetting and dispersion. The surface enrichment of sodium occurs during the spray drying process from the crystallization of dissolved sodium hydroxide at the microsphere particle surface. X-ray photoelectron spectroscopy (XPS) studies confirmed this and results are given for sodium enrichment on the surface of the sample described in Example 2.

|  | Atomic Weight % |
|---|---|
| Surface Sodium Concentration (outer 10 Angstrom layer) Without Sodium Addition | 0.2 |
| Surface Sodium Concentration With Sodium Addition | 1.9 |
| Surface Sodium Concentration of above Sample after removal of outer 100 Angstrom layer ($100 \times 10^{-10}$ m) | 0.5 |

In the case of a plastics matrix, the desired surface chemistry can be achieved with the addition of water soluble inorganic compounds such as boron oxide or boric acid prior to spray drying. Small additions (0.1-5 wt %) during slurry preparation will result in a boron enriched surface layer during spray drying. This will assist with microsphere wettability and dispersion in a plastic or polymer matrix.

Figure 14:
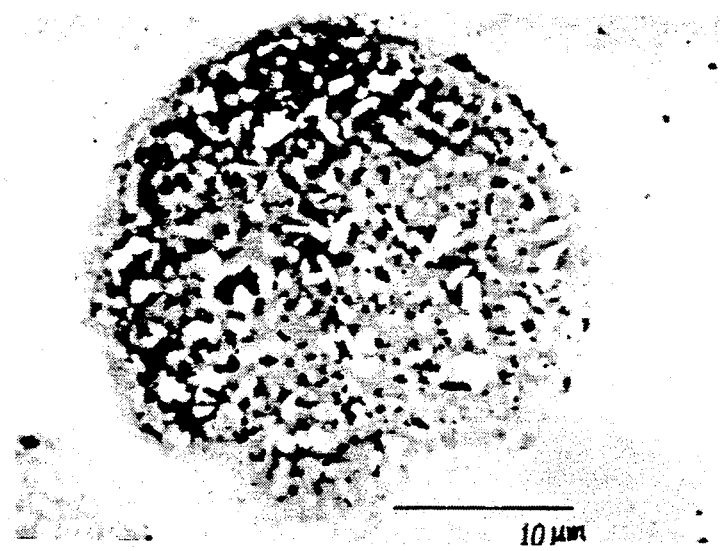
FIG. 14 is a Bachscattered electron image of a ceramic microsphere in an aluminium matrix (polished section of an extrusion)

Bauxite microspheres produced in accordance with the invention may be used for a variety of purposes and in particular may be used as functional fillers in a variety of media. The ceramic composition of the particles lend such properties as toughness, hardness, wear and abrasion resistance, chemical resistance, resistance to weathering and the like in a composite material. The surface characteristics of the microspheres may also be modified, due to crystal structure (FIGS. 14 and 17), by controlling the calcination conditions.

The microspheres embodying the invention are particularly adapted for use for reinforcement of metals and polymers and plastics. In general, aluminium, magnesium, copper, nickel or titanium, or their alloys could be used as the matrix material, but aluminium and its alloys are preferred. New aluminium alloys such as Al-Li alloys also can be used besides the conventional casting and wrought alloys.

Processes presently employed to produce MMCs can be used to produce the novel MMC disclosed above. In particular, a foundry-based method of assimilating the reinforcing material in molten metal is the most desirable for the production of low cost MMCs. A foundry-based method is therefore proposed as the preferred production method, although other methods such as those based on powder metalurgy techniques and preform infiltration also can be used. A foundry-based method is particularly suitable, because the ceramic microspheres are easily wetted by molten aluminium compared with other types of reinforcement. Furthermore, the sphericity of the reinforcing material results in increased fluidity and castability of the composite melt when compressed with other MMC melts. Consequently, production and casting of this novel composite is easier via a foundry-based method than for other MMCs.

Porous preforms could be also made with microsphere particles. These could be infiltrated by a molten alloy by use of pressure or vacuum to produce MMC billets or near net shape castings.

The wettability between microspheres and aluminium alloys is promoted by the chemical and phase composition of the ceramic microspheres as well as by the surface chemistry described above. The mineral forms present in the ceramic microspheres, in particular pseudobrookite and mullite, appear to be wet by molten metals better than pure aluminium oxide while still being resistant to them. The natural balance between the various chemical components in the microspheres thus provides the dual characteristics of good wettability and chemical inertness with respect to the matrix—a feature which is not achieved by any other reinforcing material known to us.

The spherical shape is geometrically the most isotropic shape. Furthermore, unlike other reinforcing materials, the calcined bauxite microspheres are polycrystalline which eliminates even crystallographic anisotropy which is inherent in single crystal whiskers, platelet, and particulates. Therefore, the novel spherical bauxite particulates described above have the highest degree of isotropy among all available reinforcing materials. This fact, combined with uniform distribution in the matrix, will endow MMCs with maximum isotropy.

The content of the microsphere reinforcing material in an MMC can be varied from 1 vol % to as high as 50 vol % but, when a foundry-based production method is used, practical difficulties in mixing and casting generally limit the reinforcement content to levels below 30 vol %. When a powder metallurgy production method is employed, however, this upper limit could be as high as 50 vol %. The lower limit for reinforcement content is determined by the resulting properties. To achieve noticeable enhancements in properties, a reinforcement content of at least 5 vol % must be present.

Method of preparing metal matrix composites using the preferred microspheres are described below:

EXAMPLE 3

Alloy 6061 + 15 vol % Ceramic Microspheres Produced by Melt Stirring

This example described a metal matrix composite where the commercial aluminium alloy 6061 was reinforced by ceramic microspheres. A foundry-based method of preparation was used.

Approximately 3.5 kg of aluminium alloy 6061 was melted in a crucible. A quantity of ceramic microspheres was weighted out so as to produce an MMC with reinforcement content of 15 vol %. This measured quantity was preheated to 200° C. in an oven. The size of the microspheres of bauxite varied between about 1 um and 40 um. A scanning electron micrograph of these particles is shown in FIG. 1, which demonstrates their sphericity and polycrystallinity.

The molten alloy was then stirred by a rotor at 700° C. in order to produce a vortex on the melt surface. Hot ceramic microsphere particulates were then added into the vortex. After adding the particulates, stirring was stopped and the molten composite was squeeze cast into blocks of 110 mm × 60 mm × 20 mm. Specimens were machined from these blocks for testing.

Figure 2:
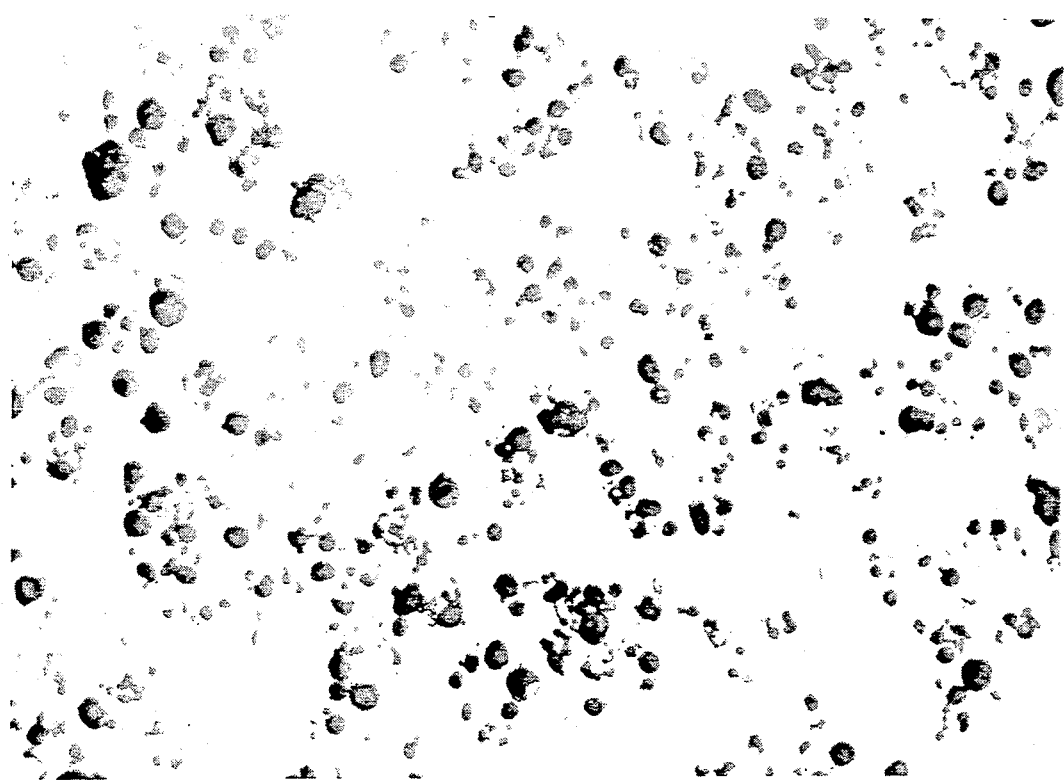
FIG. 2 shows the microstructure of squeeze cast alloy 6061+15 vol % ceramic microspheres (mag. ×170)

A typical microstructure of the composite is shown in FIG. 2. It demonstrates that the particles are individually wetted. The room temperature tensile test results after a T6 heat treatment are given in Table 1. Results are given for a $Al_2O_3$ reinforced 6061, produced via a foundry process by a commercial manufacturer, for comparison. The data show that the microsphere reinforced MMC exhibits higher yield strength than the corresponding commercial MMC while being comparable in other properties.

Figure 3:
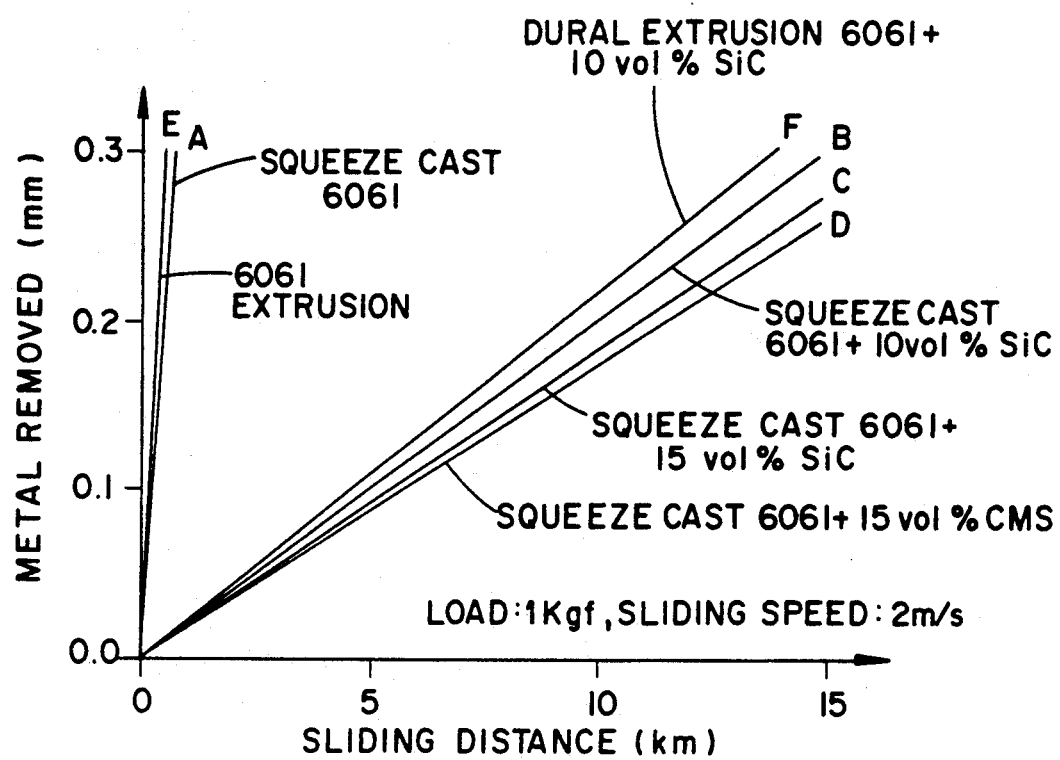
FIG. 3 is a graph showing sliding wear resistance of unreinforced 6061 and 6061 reinforced with ceramic microspheres or SiC.

Results of the pin-on-disc wear tests are given in FIG. 3. The microsphere reinforced MMC exhibits wear resistance comparable with SiC reinforced MMCs.

EXAMPLE 4

Alloy 6061+10 vol % Ceramic Microspheres by Compocasting

Approximately 3.5 kg of commercial aluminium alloy 6061 was melted in a crucible and 10 vol % ceramic microspheres were preheated as in Example 1.

When the alloy was molten, 0.3 wt % Mg was added to the alloy to compensate for Mg lost in the production process. The metal was then stirred at low speeds (120–150 rpm) by a multiblade stirrer so that a vortex did not form. The uppermost blades of the stirrer were level with the liquid surface.

The melt was cooled to the two-phase region while stirring to a thixotropic slurry. When a temperature of 645° C. was reached, the preheated ceramic microspheres were added at a slow and steady rate. The uppermost blades assimilated the bauxite into the slurry while sweeping its surface. After the completion of bauxite addition, stirring was continued in the temperature range 605° C.–645° C. until all the bauxite was wetted and distributed in the liquid phase of the slurry.

The material was then reheated to 700° C. while being stirred to remelt the whole slurry. It was cast into a 5 inch diameter billet and extruded into 25 mm diameter bar after heat treatment as in Example 1 are given in Table 1.

EXAMPLE 5

Alloy 6061+10 vol % Ceramic Microspheres by Powder Metallurgy

Powders of Al (−325 mesh), Mg (−325 mesh) and Si (−20 um) were weighed out in a ratio to comply with the specification for alloy 6061 and to make the total weight of approximately 7 kg. The powders were mixed with 10 vol % ceramic microspheres and were milled in an inert atmosphere for about 15 minutes.

The blended powder was filled and vibrated into an elastomer mould of diameter 89 mm (3.5 inch) and length 430 mm (17 inch). The mould was vacuum sealed and cold-isostatically pressed. The elastomer mould was then stripped and the cold pressed billet was sintered to produce a 95% dense billet.

The sintered billet was extruded into 12.5 mm (0.5 inch) diameter bar and room temperature mechanical properties were determined (Table 1) after the heat treatment as in Example 1 and 2.

TABLE 1

MECHANICAL PROPERTIES OF 6061-BASED BAUXITE COMPOSITES AFTER T6 HEAT TREATMENT

| Material | Production Method | Yield Stress (MPa) | Modulus (GPa) |
| --- | --- | --- | --- |
| 6061 + 15 vol % Ceramic Microspheres | Melt stirred and squeeze cast | 328 | 86.6 |
| 6061 + 10 vol % Ceramic Microspheres | Compocast and extruded | 300 | 78.3 |
| 6061 + 10 vol % Ceramic microspheres | Powder metallurgy CIPPED, sintered and extruded | 320 | 78 |
| 6061 + 0.5 Mg + 19 V/O CMS (−30 um) (Standard T6) | Cast and extruded | 305 | 88 |
| 6061 + 0.5 Mg + 19 V/O CMS (−30 um) (New T6) | Cast and extruded | 330 | 88 |
| PM 6061 + 19 V/O CMS (−100 um) (Standard T6) | Sintered and extruded | 327 | 88 |
| Duralcan 6061 + 10 vol % Al₂O₃* | Melt stirred and extruded | 296 | 81 |

*From Duralcan data sheets.*
1. 1.5 h/530° C. 20 h/RT pre age, age 8 h/175° C.
2. 1.5 h/530° C., direct age 6 h/160° C.

Further composites formed using microspheres embodying the present invention are further disclosed in the following example:

| Description: | Comral-85 is an aluminum matrix, up to 20 v/o, ceramic microsphere reinforced composite. |
| --- | --- |
| Matrix: | Standard alloy 6061 |
| Reinforcement: | Alumina containing microspheres: type CMS-20 with an average particle size of 20 microns. |
| Designation: | 6061/A1203/20 p (proposed Aluminum Association) |

Tensile Properties of 19 mm Bar:

| Dynamic Young's Modulus/(min) | (0.2%) Yield Strength | Ultimate Tensile Strength | Elongation |
| --- | --- | --- | --- |
| As Extruded Properties: | | | |
| — | 105 MPa | 200 MPa | 16% |
| Heat Treated Properties | | | |
| 85 GPa | 305 MPa | 330 MPa | 3.4% |
| 12.3 Msi | 44.2 ksi | 47.9 ksi | 3.4% |
| in the "T6" conditions - 1.5 hrs @ 530° C.; age 8 hrs @ 175° C. | | | |
| Conventional 6061 (for comparison) | | | |
| 69 GPa | 276 MPa | 310 MPa | 17% |
| 10 Msi | 40 ksi | 45 ksi | 17% |

Figure 4:
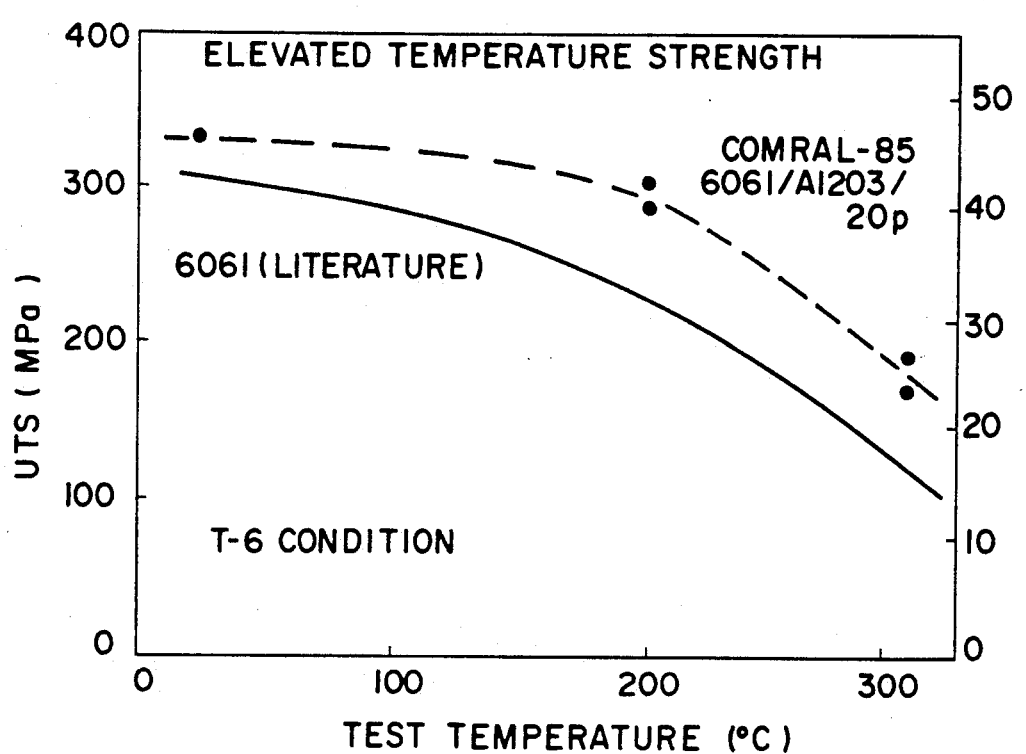
FIG. 4 shows the improved elevated temperature tensile strength of COMRAL-85 compared with unreinforced 6061.
Figure 5:
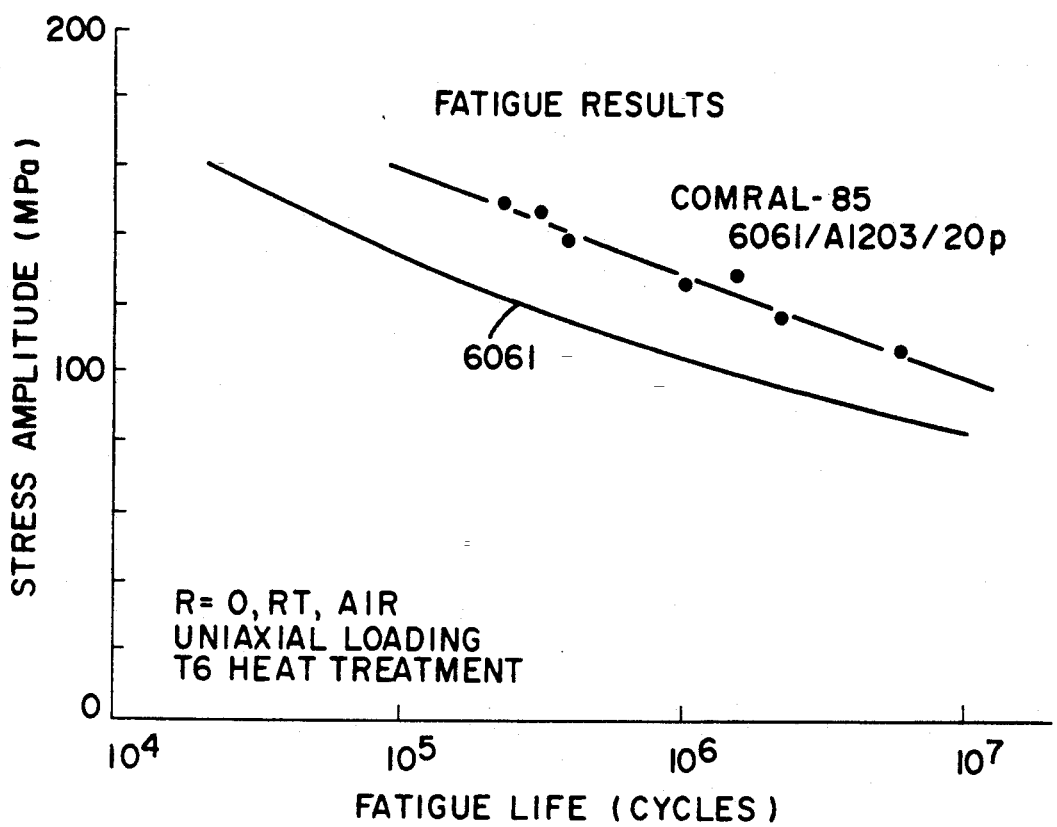
FIG. 5 shows the improved fatigue strength of COMRAL-85 compared with unreinforced 6061.
Figure 6:
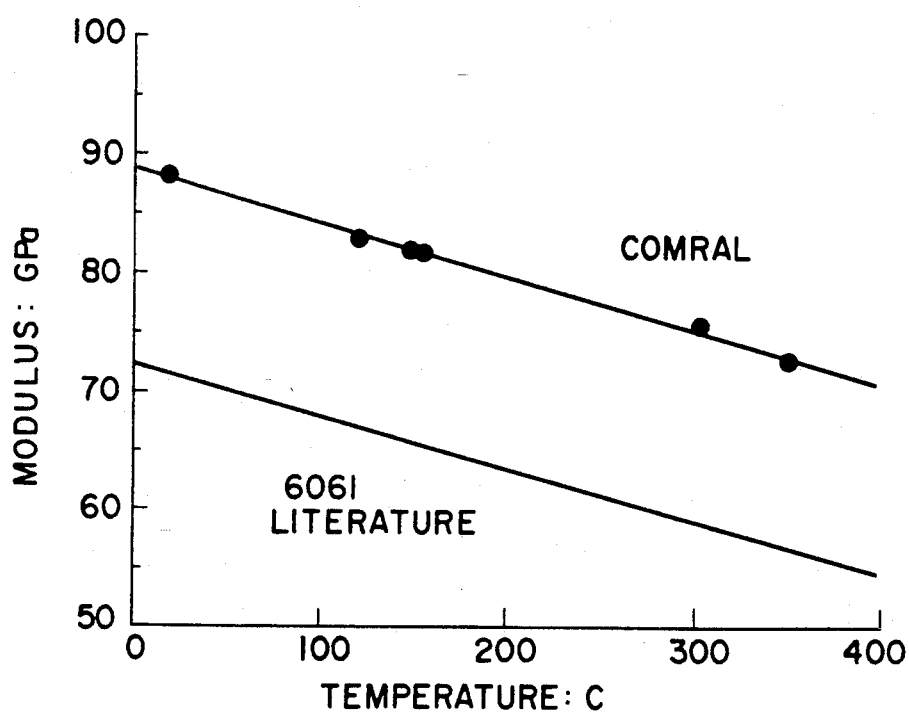
FIG. 6 shows increased elevated temperature elastic modulus of COMRAL-85 compared with unreinforced 6061 (determined by the piezo-electric ultrasonic crystal oscillating technique-PUCO)
Figure 7:
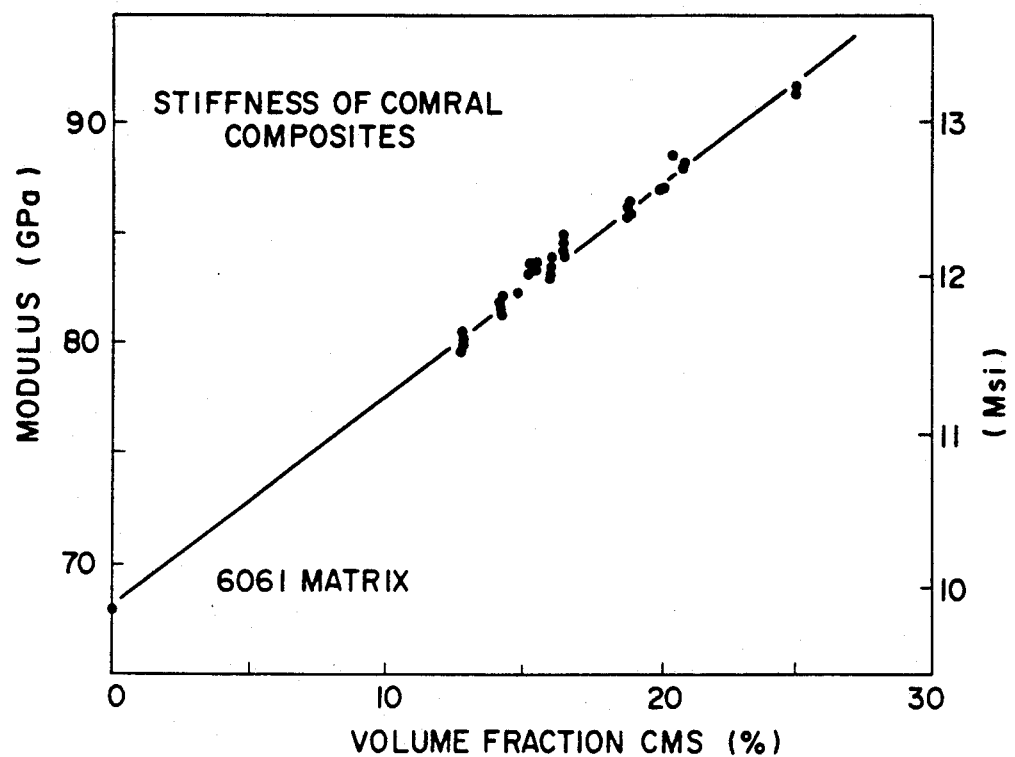
FIG. 7 shows the stiffness of COMRAL composites as a function of volume fraction of ceramic microsphere reinforcement.
Figure 8:
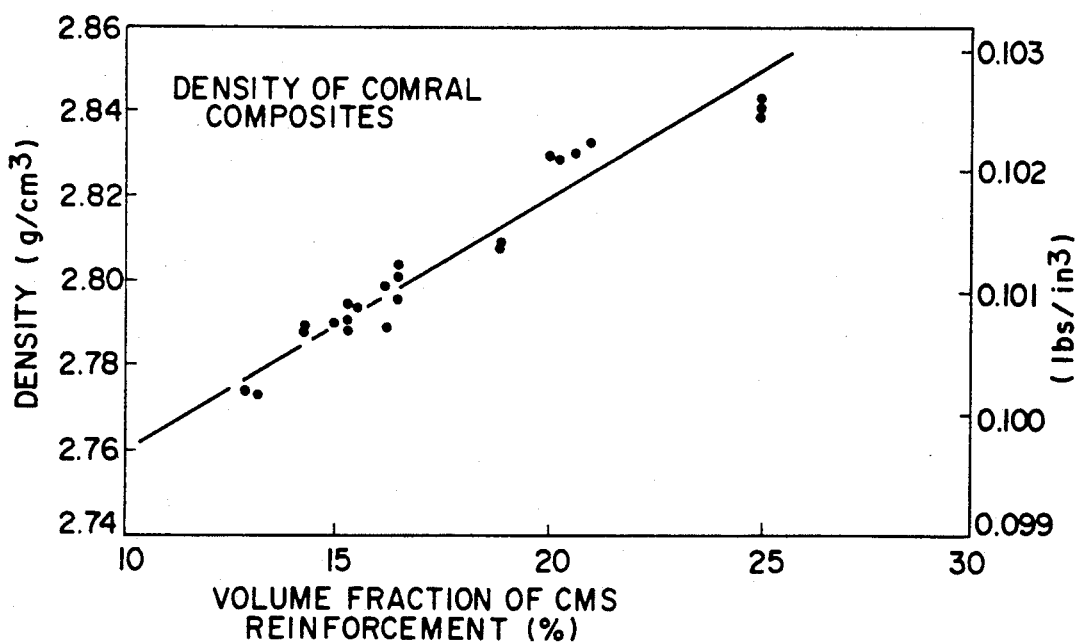
FIG. 8 shows the density of COMRAL composites as a function of volume fraction of ceramic microsphere reinforcement.
Figure 9:
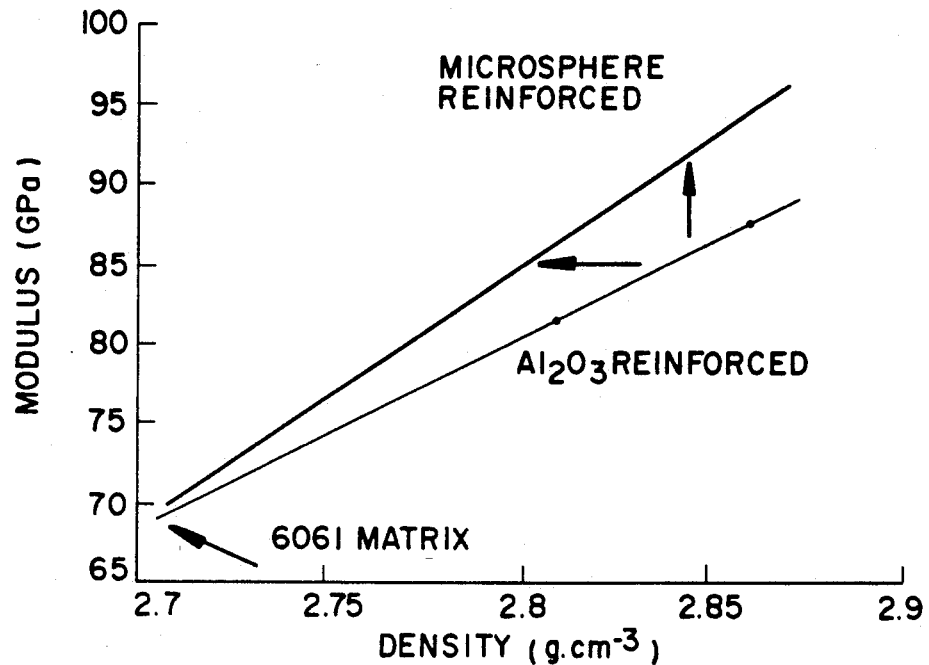
FIG. 9 is an improved modulus-density combination of composites reinforced with ceramic microspheres compared with pure $Al_2O_3$ reinforcement.
Figure 15:
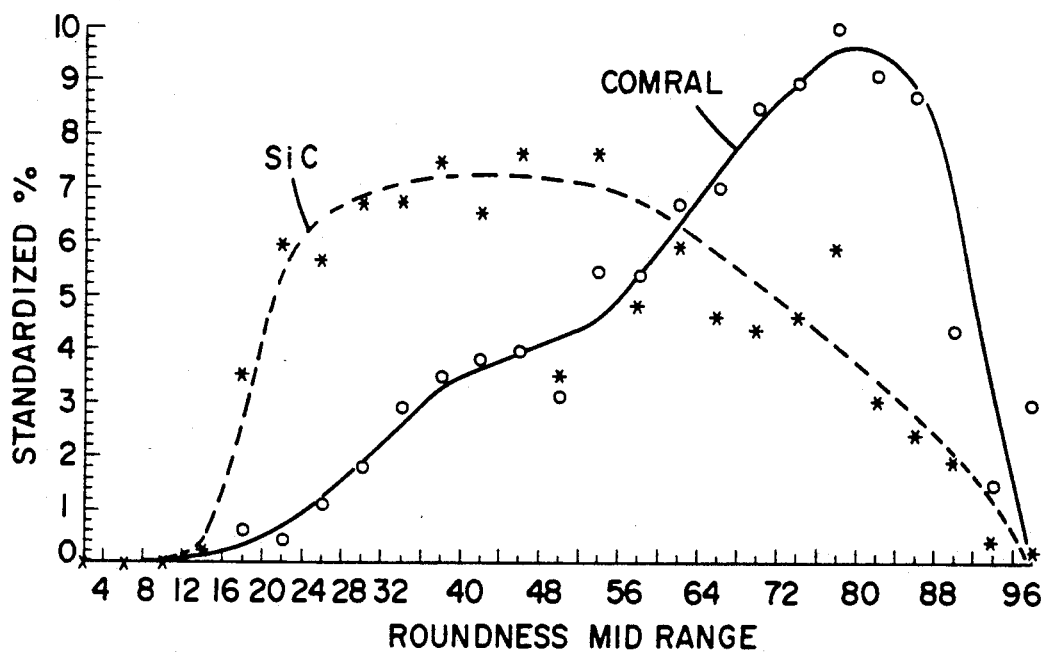
FIG. 15 is an image analysis of the shape of ceramic particulate in SiC reinforced composite compared with ceramic microsphere reinforced composite.
Figure 18:
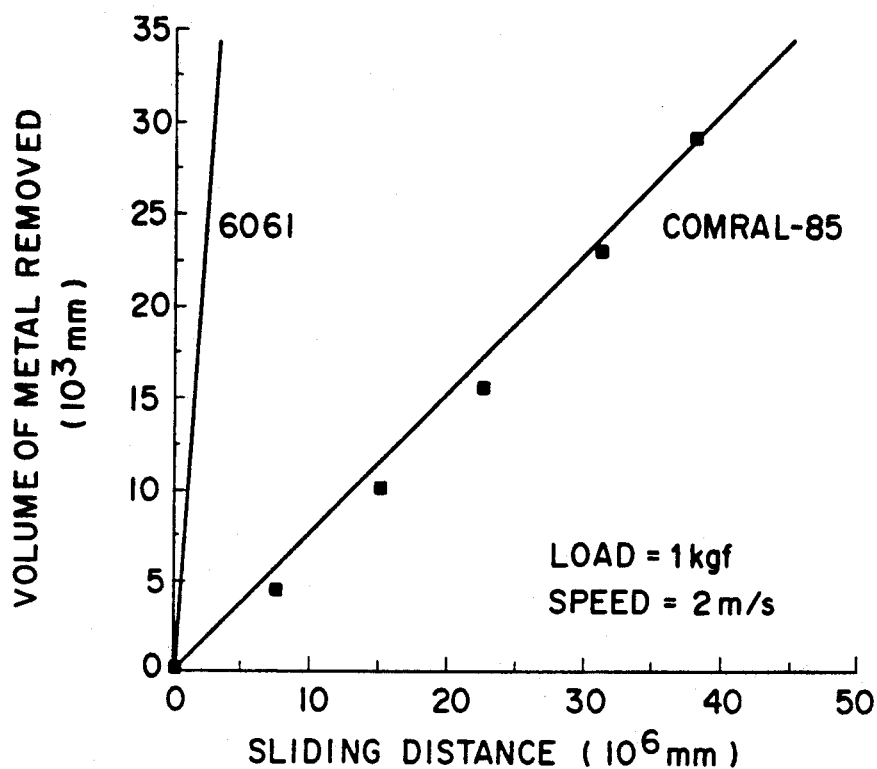
FIG. 18 shows the pin-on-disk sliding wear resistance of COMRAL-85 compared with unreinforced 6061, and FIG. 19 compares the fatigue of COMRAL-85 and a commercial $Al_2O_3$ reinforced composite and unreinforced 6061.
Figure 19:
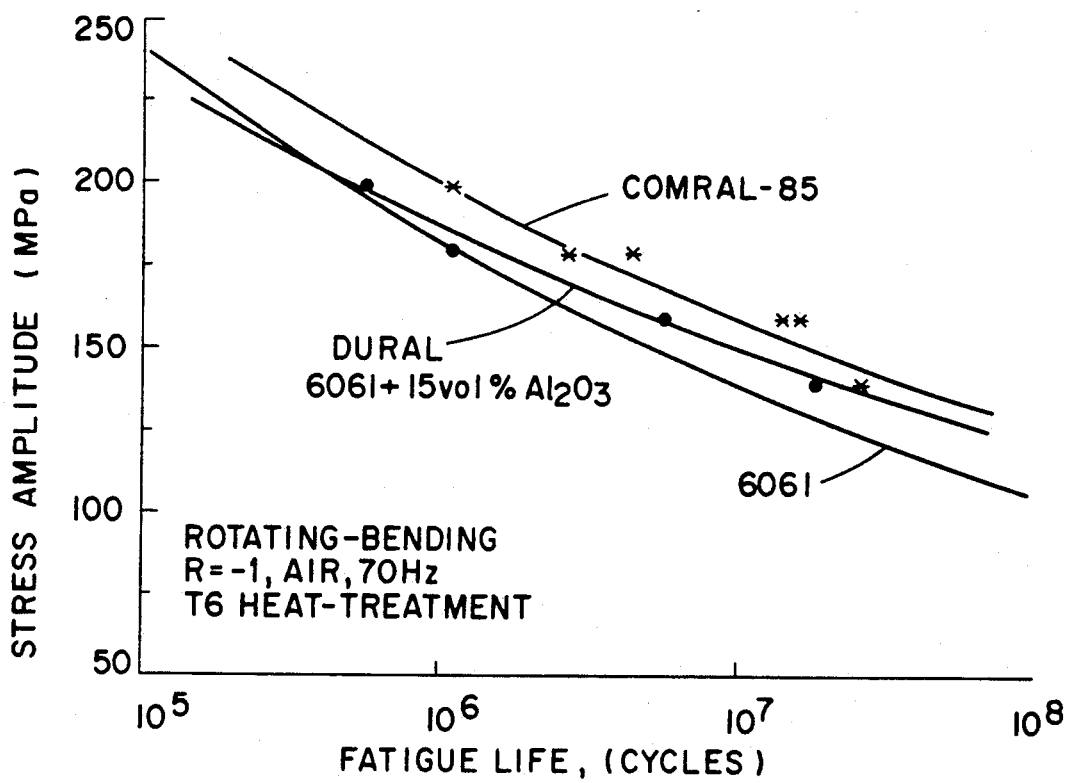

Fatigue and elevated temperature properties are shown in FIGS. 4, 5 and 6 while the room temperature stiffness and density properties are shown in FIGS. 7, 8 and 9. Micrographs of the composite and an alternative composite (Comral 80) are shown in FIGS. 10 to 14. Comral-80 is a composite with matrix 601 (a casting alloy). A comparative analysis of a commercial composite and a composite embodying the invention is provided in FIG. 15 and shows the significantly higher percentage of more spherical particles provided by the microspheres embodying the invention and FIGS. 16 and 17 are micrographs of the microspheres from which their sphericity and fine crystal structure is self-evident. The excellent wear resistance of Comral-85 is evident from FIG. 18. The excellent fatigue resistance of COMRAL-85 is compared with a commercial composite and the unreinforced 6061 in FIG. 19.

Composites, such as the above example, embodying the invention can be heated treated to achieve strengths higher than those quoted in Example 6.

EXAMPLE 7

Various ceramic microsphere reinforced composites were prepared by casting and extrusion of 5" billets into 19 mm rod. A range of volume fractions of particulate and various particulate size ranges were used. Evaluation of the tensile properties in (Table 3) indicate that the best combination of tensile strength and ductility is achieved with cermic particulate of size less than 30 um.

EXAMPLE 8

Various ceramic microsphere reinforced composite were prepared by adding 10 vol % of particulate to alloy 6061. The final calcination temperature for preparation of the microspheres was varied. Excellent tensile properties are obtained (Table 3), particularly for microspheres with a final calcination temperature in the range of 1400° C.–1450° C.

TABLE 2

Room temperature tensile properties of T6 heat-treated extrusions for various microsphere reinforced 6061-based composites

| | Nominal Vol. Fraction | Reinforcement Size | No. of Batches | $R_{po.2}$ (MPa) | $R_m$ (MPa) | $A_5$ (%) | No. of Tests |
|---|---|---|---|---|---|---|---|
| A | 15 | 0–100 um | 2 | 304 | 326 | 2.4 | 8 |
| B | | 0–45 um | 3 | 302 | 322 | 3.4 | 14 |
| C | | 0–30 um | 1 | 301 | 328 | 4.0 | 12 |
| D | 19 | 0–30 um | 4 | 316 | 344 | 3.7 | 23 |
| E | 24 | 0–45 um | 1 | 330 | 345 | 0.7 | 4 |

TABLE 3

Typical tensile properties for 6061 + 0.3 Mg + 10 vol % CMS (T6 temper) with different CMS microstructures

| Sintering condition | S.A. ($m^2/g$) | L.F.D. ($g/cm^3$) | $R_{po.2}$ (MPa) | $R_m$ (MPa) | E (GPa) | $A_5$ (%) | No. of tests |
|---|---|---|---|---|---|---|---|
| 1350° C./3 hrs | 1.01 | 1.46 | — | — | — | — | —* |
| 1400° C./1 hr | 0.18 | 1.55 | — | — | — | — | —* |
| 1400° C./3 hrs | 0.13 | 1.50 | 298 | 315 | 81.0 | 3.2 | 2 |
| 1450° C./1 hr | 0.12 | 1.52 | 309 | 332 | — | 5.7 | 2 |
| 1450° C./3 hrs | 0.19 | 1.47 | 301 | 318 | 81.8 | 1.9 | 2 |
| 1480° C./3 hrs | 0.20 | 1.37 | 302 | 313 | 81.0 | 1.4 | 2 |
| 6061 + 0.3 Mg | — | — | 266 | 295 | 68.3+ | 19.5 | 3 |

*Extensive reaction was observed, no test conducted
+From Metals Handbook
S.A. = surface area of CMS
L.F.D. = loose fill density of CMS
$R_{po.2}$ = 0.2% proof stress
$R_m$ = ultimate tensile stress
E = Young's modulus
$A_5$ tensile elongation

We claim:

1. A method for the manufacture of bauxite microspheres comprising the steps of:
   preparing a dispersion of bauxite or bauxitic clay;
   classifying the dispersed bauxite particles to recover the ultrafine fraction;
   adding small quantities of water soluble salts, mineral compositions or organometallic complexes to control the microsphere surface chemistry so as to enhance the wetting and dispersion of the microsphere and improve its ability to bond strongly with the matrix materials in use;
   spraying drying the dispersion to produce green microspheres of a predetermined mean particle diameter, and
   subjecting said green microspheres to calcination and sintering to produce microspheres having a size less than 100 micrometers, said microsphere being characterised by a substantially solid form having a pycnometric density substantially falling in the range 3.2 to 3.9 $g/cm^3$, a BET surface area substantially falling in the range 0.05 to 0.5 $m^2/g$ and a crystal grain size less than 4 micrometres.

2. A method for the manufacture of ceramic microsphere comprising the steps of:
   a) preparing a dispersion of alumina containing particles,
   b) classifying the dispersed alumina containing particles to recover the ultrafine fraction,
   c) adding small quantities of water soluble salts, mineral compositions or organometallic complexes to control the microsphere surface chemistry so as to enhance the wetting and dispersion of the microsphere and improve its ability to bond strongly with the matrix materials in use,
   d) spray drying the dispersion to produce green microspheres of a predetermined mean particle diameter, and
   e) subjecting said green microspheres to calcination and sintering to produce microspheres having a size less than 100 micrometers, said microsphere having a substantially solid form.

3. The method of claim 2, wherein calcination is carried out at a temperature which produces a sufficiently high density and a crystal grain size not exceeding 4 micrometers.

4. The method of claim 3, wherein calcination is carried out substantially within the temperature range 1100° C. to 1600° C.

5. The method of claim 3, wherein calcination is carried out substantially within the temperature range 1300° C. to 1450° C.

6. The method according to claim 2, wherein said alumina containing particles are bauxite or bauxitic clay.

7. The method according to claim 6, wherein said microsphere has a pycnometric density falling in the range of about 3.2 to 3.9 $g/cm^3$ a BET surface area falling in the range of about 0.05 to 0.5 $m^2/g$, and a crystal grain size less than 4 micrometers.

* * * * *